(12) United States Patent
Swarup et al.

(10) Patent No.: US 9,518,193 B2
(45) Date of Patent: Dec. 13, 2016

(54) COATING PROCESSES USING WATERBORNE CURABLE FILM-FORMING COMPOSITIONS CONTAINING POLYMERS DERIVED FROM NATURAL GAS RAW MATERIALS

(71) Applicant: PPG INDUSTRIES OHIO, INC., Cleveland, OH (US)

(72) Inventors: Shanti Swarup, Allison Park, PA (US); Kurt G Olson, Gibsonia, PA (US); John E Schwendeman, Wexford, PA (US); Leigh Ann Humbert, Pittsburgh, PA (US); Kelly E Lutz, Pittsburgh, PA (US); Carol Lynn Boggs, Cheswick, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 120 days.

(21) Appl. No.: 14/164,676

(22) Filed: Jan. 27, 2014

(65) Prior Publication Data

US 2015/0210883 A1 Jul. 30, 2015

(51) Int. Cl.

| | |
|---|---|
| *B05D 1/36* | (2006.01) |
| *C09D 133/12* | (2006.01) |
| *B05D 3/02* | (2006.01) |
| *B05D 7/14* | (2006.01) |
| *C09D 131/04* | (2006.01) |
| *C25D 13/00* | (2006.01) |
| *B05D 7/00* | (2006.01) |
| *B01J 13/14* | (2006.01) |
| *B01J 13/20* | (2006.01) |
| *B01J 13/22* | (2006.01) |
| *C09B 67/02* | (2006.01) |

(52) U.S. Cl.
CPC .............. *C09D 133/12* (2013.01); *B01J 13/14* (2013.01); *B01J 13/206* (2013.01); *B01J 13/22* (2013.01); *B05D 1/36* (2013.01); *B05D 3/0254* (2013.01); *B05D 7/14* (2013.01); *B05D 7/532* (2013.01); *C09B 67/0097* (2013.01); *C09D 131/04* (2013.01); *C25D 13/00* (2013.01); *B05D 7/542* (2013.01)

(58) Field of Classification Search
None
See application file for complete search history.

(56) References Cited

U.S. PATENT DOCUMENTS

| | | | | |
|---|---|---|---|---|
| 5,298,559 A | * | 3/1994 | Fujii | C08F 285/00 524/504 |
| 5,641,574 A | | 6/1997 | Kasari et al. | |
| 6,180,181 B1 | * | 1/2001 | Verardi | B05D 7/572 427/409 |
| 6,252,004 B1 | * | 6/2001 | Blankenship | C08F 265/04 525/244 |
| 6,316,107 B1 | * | 11/2001 | Lubnin | C08F 259/04 428/407 |
| 6,531,541 B1 | | 3/2003 | Desai et al. | |
| 2003/0225190 A1 | * | 12/2003 | Borbely | C08F 257/02 523/201 |

FOREIGN PATENT DOCUMENTS

| | | |
|---|---|---|
| JP | 2009-263581 | 11/2009 |
| KR | 1057532 B1 | 8/2011 |
| WO | WO 00/31159 | 6/2000 |
| WO | WO 2015/113049 A1 * | 7/2015 |

OTHER PUBLICATIONS

PCT/US2015/013101, Written Opinion of the International Searching Authority, Sep. 18, 2015, 6 pages.*

* cited by examiner

*Primary Examiner* — William Philip Fletcher, III
(74) *Attorney, Agent, or Firm* — Krisanne Shideler

(57) ABSTRACT

A method is provided for forming a composite coating on a substrate comprising:
(A) applying a first coating composition to a surface of the substrate; and
(B) applying a second coating composition to the first coating prior to substantially heating or curing the first coating. The first and/or second coating composition is a waterborne curable film-forming composition comprising:
(a) an aqueous dispersion of internally crosslinked polymeric microparticles having a core-shell morphology and having reactive functional groups; and
(b) a crosslinking agent. The core of the polymeric microparticles is prepared from a monomer mixture comprising at least 20 percent by weight of a monomer having the structure:

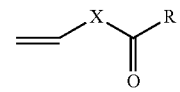

wherein X is N or O; R is a linear or branched alkyl group having 1 to 18 carbon atoms, or R is bonded to X to form a 5- to 7-member ring.

16 Claims, No Drawings

COATING PROCESSES USING WATERBORNE CURABLE FILM-FORMING COMPOSITIONS CONTAINING POLYMERS DERIVED FROM NATURAL GAS RAW MATERIALS

FIELD OF THE INVENTION

The present invention relates to coating processes using waterborne curable film-forming compositions containing polymers derived from natural gas raw materials.

BACKGROUND OF THE INVENTION

A traditional automotive paint process begins with the application of pretreatment and electrocoat followed by a primer layer. After the primer layer is cured, a topcoat layer of basecoat and clearcoat is applied and cured. The result is a five-layer lustrous and durable paint finish. This process is the industry norm, whether the topcoat chemistry is based on water, solvent, or powder. However, this process has become a focus of technical brainstorming because it is both costly and time-consuming. The normal paint process requires well over 3 hours to complete and uses considerable amounts of paint materials, electricity, natural gas, and manpower.

In automotive coating processes, efforts are constantly made to reduce energy consumption and costs, as well as atmospheric pollution caused by volatile solvents which are emitted during a painting process. However, it is often difficult to provide adequate physical properties without applying multiple coating layers, each having their own cure regimen. In addition to achieving near-flawless appearance, automotive coatings must be durable and chip resistant, historically made possible by using multiple coating layers, each serving its own purpose.

The current state of the art automobile painting process involves electrophoretic application of a paint layer to the bare or treated metal substrate followed by fully curing the so-applied layer. A primer layer, whose purpose is primarily to provide chip resistance, UV opacity, and substrate filling (to smooth surface defects) is then applied, followed again by a full curing cycle. A colored basecoat layer is then applied, generally followed by a heated flash and then application of a final clearcoat layer. These two layers are then co-cured to produce the final coated article. There has been a tendency in the last decade to reduce the paint booth footprint, reduce the number of intermediate bake cycles and hence energy expenditure, reduce the number of coating layers and therefore system complexity, while maintaining the high level of optical quality and appearance of the resulting coated vehicles. The general name given to such modified paint processes is Compact Process.

In order to reduce layers, it is usually the primer layer and its associated oven that is eliminated, and the basecoat composition is then typically designed to incorporate some of the primer properties such as chip resistance and substrate filling. In this case the basecoat is typically applied in two layers with the composition of the first layer being modified to incorporate some heretofore primer-associated properties. After application of the two basecoat layers, a heated flash may be employed to remove some of the solvent and is followed by clearcoat application. The multi-component composite coating composition, or "coating stack", is then co-cured to provide the final article. In order to provide desired basecoat opacity and protection of the electrocoat layer, the sum of basecoat layer thicknesses is generally greater than the thickness of a basecoat applied over a fully baked conventional primer.

An alternate possibility is known as a 3C1B (3 coat-1 bake) process and involves keeping the primer layer per se, but removing the complete bake after the primer layer. The three layers (primer/basecoat/clearcoat) are applied wet-on-wet-on-wet, with or without heated intermediate flashes between layers, and co-cured in a single cure oven to produce the final article. This process maintains the functionality of the primer layer but removes the cost associated with the primer oven.

Compact Coating systems that provide the desired physical and optical quality over a range of intermediate flash conditions are needed in order to accommodate the different processing parameters of different manufacturers. The system must also be designed to guarantee appearance consistency and quality at different locations on the same vehicle, which may undergo different process conditions during coating. Finally, manufacturers who currently employ heated intermediate flashes are constantly looking to reduce the temperature and time of these steps so they can reduce their energy expense and reduce their line footprint. For these reasons, it is desired to develop resins and coating compositions that provide coating quality in both appearance and durability in a Compact Process while reducing process energy requirements.

SUMMARY OF THE INVENTION

The present invention is directed to a method for forming a composite coating on a substrate comprising:
(A) applying a first coating composition to at least a portion of a surface of the substrate; and
(B) applying a second coating composition to at least a portion of the first coating formed in step (A) prior to substantially heating or curing the first coating, to form a secondary coating thereon; wherein the first and/or second coating composition is a waterborne curable film-forming composition comprising:
(a) an aqueous dispersion of internally crosslinked polymeric microparticles having a core-shell morphology and having reactive functional groups; and
(b) a crosslinking agent having functional groups reactive with functional groups on the polymeric microparticles;
wherein the core of the polymeric microparticles is prepared from a monomer mixture comprising at least 20 percent by weight of a monomer having the following structure:

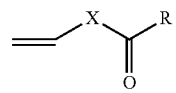

wherein X is N or O; R is a linear or branched alkyl group having 1 to 18 carbon atoms, or R is bonded to X to form a 5- to 7-member ring.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The various embodiments and examples of the present invention as presented herein are each understood to be non-limiting with respect to the scope of the invention.

As used in the following description and claims, the following terms have the meanings indicated below:

By "polymer" is meant a polymer including homopolymers and copolymers, and oligomers. By "composite material" is meant a combination of two or more differing materials.

The term "curable", as used for example in connection with a curable composition, means that the indicated composition is polymerizable or cross linkable through functional groups, e.g., by means that include, but are not limited to, thermal (including ambient cure), catalytic, electron beam, chemical free-radical initiation, and/or photo-initiation such as by exposure to ultraviolet light or other actinic radiation.

The term "cure", "cured" or similar terms, as used in connection with a cured or curable composition, e.g., a "cured composition" of some specific description, means that at least a portion of the polymerizable and/or crosslinkable components that form the curable composition is polymerized and/or crosslinked. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive groups occurs, the rate of reaction of the remaining unreacted reactive groups becomes progressively slower. The polymerizable composition can be subjected to curing conditions until it is at least partially cured. The term "at least partially cured" means subjecting the polymerizable composition to curing conditions, wherein reaction of at least a portion of the reactive groups of the composition occurs, to form a polymerizate. The polymerizable composition can also be subjected to curing conditions such that a substantially complete cure is attained and wherein further curing results in no significant further improvement in polymer properties, such as hardness.

The term "reactive" refers to a functional group capable of undergoing a chemical reaction with itself and/or other functional groups spontaneously or upon the application of heat or in the presence of a catalyst or by any other means known to those skilled in the art.

By "essentially free" of a material is meant that a composition has only trace or incidental amounts of a given material, and that the material is not present in an amount sufficient to affect any properties of the composition.

The present invention is drawn to a method for forming a composite coating on a substrate. Substrates to which compositions of the present invention may be applied include rigid metal substrates such as ferrous metals, aluminum, aluminum alloys, copper, and other metal and alloy substrates. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. The substrate may alternatively comprise a composite material such as a fiberglass composite. Car parts typically formed from thermoplastic and thermoset materials include bumpers and trim. It is desirable to have a coating system which can be applied to both metal and non-metal parts.

The shape of the metal substrate can be in the form of a sheet, plate, bar, rod or any shape desired, but it is usually in the form of an automobile part, such as a body, door, fender, hood or bumper. The thickness of the substrate can vary as desired.

Before depositing any coating compositions upon the surface of the substrate, it is common practice, though not necessary, to remove foreign matter from the surface by thoroughly cleaning and degreasing the surface. Such cleaning typically takes place after forming the substrate (stamping, welding, etc.) into an end-use shape. The surface of the substrate can be cleaned by physical or chemical means, or both, such as mechanically abrading the surface or cleaning/degreasing with commercially available alkaline or acidic cleaning agents which are well known to those skilled in the art, such as sodium metasilicate and sodium hydroxide. A non-limiting example of a cleaning agent is CHEMKLEEN 163, an alkaline-based cleaner commercially available from PPG Industries, Inc.

Following the cleaning step, the substrate may be rinsed with deionized water or an aqueous solution of rinsing agents in order to remove any residue. The substrate can be air dried, for example, by using an air knife, by flashing off the water by brief exposure of the substrate to a high temperature or by passing the substrate between squeegee rolls.

In certain embodiments of the present invention, an initial step of forming an electrodeposited coating upon the surface of the substrate prior to applying the first coating composition of step (A) may be performed, then the first coating composition is applied directly onto the electrodeposited coating. Suitable electrodepositable coating compositions include conventional anionic or cationic electrodepositable coating compositions. Methods for electrodepositing coatings are well known to those skilled in the art and a detailed discussion thereof is not included here. Suitable compositions and methods are discussed in U.S. Pat. No. 5,530,043 (relating to anionic electrodeposition) and U.S. Pat. Nos.

5,760,107; 5,820,987 and 4,933,056 (relating to cationic electrodeposition) which are hereby incorporated by reference in their entireties. The electrodeposited coating is usually cured prior to the application of the first coating composition. Curing conditions may be those typically used for electrodeposited coating compositions. After curing the electrodeposited coating, the first coating composition may then be applied directly onto the electrodeposited coating.

In step (A) of the process of the present invention, a first coating composition is applied to at least a portion of a surface of the substrate. In step (B), a second coating composition is applied to at least a portion of the first coating formed in step (A), prior to substantially heating or curing the first coating, to form a secondary coating thereon. The first and/or second coating composition is a waterborne curable film-forming composition comprising:

(a) an aqueous dispersion of internally crosslinked polymeric microparticles having a core-shell morphology and having reactive functional groups; and (b) a crosslinking agent having functional groups reactive with functional groups on the polymeric microparticles. The core of the polymeric microparticles is prepared from a monomer mixture comprising at least 20 percent by weight of a monomer having the following structure:

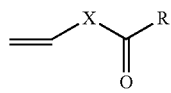

wherein X is N or O; R is a linear or branched alkyl group having 1 to 18 carbon atoms, or R is bonded to X to form a 5- to 7-member ring; based on the total weight of monomers in the monomer mixture. Though not intending to be bound by theory, it is believed that the use of vinyl esters and amides of alkyl and cycloalkyl carboxylic acids and lactams, such as vinyl esters of alkyl carboxylic acids, in the polymeric microparticles at such high levels contributes to the smoothness and chip resistance of resulting composite coatings, compared to composite coatings formed by processes using compositions with polymeric microparticles that do not contain high levels of such compounds in the core of the polymeric microparticle.

The polymeric microparticles have a core/shell structure. The core (interior domain) and shell (surface domain) polymers may be covalently attached to each other, and the polymeric microparticles are formed by step-wise emulsion polymerization of ethylenically unsaturated monomers. Exemplary polymerization methods are demonstrated in the examples below. The core constitutes 75 to 85 percent by weight of the polymeric microparticle, while the shell makes up 15-25 percent by weight of the polymeric microparticle. Also, the core may be internally crosslinked through the use of monomers having multiple ethylenically unsaturated groups, such as ethylene glycol dimethacrylate. These internally crosslinking monomers are typically used in amounts up to 10 percent by weight, such as 3-10 percent by weight. The shell polymer is designed to be more polar than the core by using polar monomers having functional groups such as hydroxyl and acid groups. The shell polymer is typically formed from acid functional ethylenically unsaturated monomer in an amount sufficient to allow for dispersion of the polymeric microparticles in an aqueous medium, such as 25-35 percent by weight, based on the total weight of monomers used to prepare the shell.

Ethylenically unsaturated monomers used to prepare the core of the polymeric microparticles may include acid functional monomers such as acrylic acid, methacrylic acid, maleic anhydride, fumaric acid and the like; alkyl esters of acrylic acid or methacrylic acid, usually together with one or more other polymerizable ethylenically unsaturated monomers, including monomers having multiple ethylenically unsaturated groups. Useful alkyl esters of acrylic acid or methacrylic acid include aliphatic alkyl esters containing from 1 to 30, and preferably 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene, although styrene is not preferred and if used should be in an amount less than 10 percent by weight; nitriles such as acrylonitrile and methacrylonitrile; vinyl and vinylidene halides such as vinyl chloride and vinylidene fluoride and vinyl compounds, such as those having the structure:

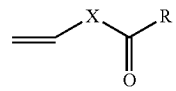

wherein X is N or O; R is a linear or branched alkyl group having 1 to 18 carbon atoms, or R is bonded to X to form a 5- to 7-member ring. Examples of vinyl esters of alkyl carboxylic acids include vinyl acetate, vinyl pivalate, vinyl laurate, vinyl dodecanoate, and the like. Examples of other suitable vinyl compounds having the above structure include vinyl amides and vinyl lactams such as vinyl pyrrolidone and vinyl caprolactam. One or more of these vinyl compounds are used to prepare the core of the polymeric microparticles in an amount of at least 20 percent by weight, such as at least 30 percent by weight, or at least 35 percent by weight, or at least 40 percent by weight, based on the total weight of monomers used to prepare the core of the polymeric microparticle. In particular embodiments the monomer mixture used to prepare the core of the polymeric microparticles is essentially free of styrene. By "essentially free" is meant that if the material is present in the composition, it is present incidentally in an amount less than two percent by weight, usually less than trace amounts.

Amide functional ethylenically unsaturated monomers such as (meth)acrylamide and hydroxyl functional monomers including any of those disclosed below may also be used in the preparation of the core of the polymeric microparticles. An exemplary monomer mixture used to prepare the core of the polymeric microparticles comprises 3-10 percent by weight ethylene glycol dimethacrylate, greater than 30 percent by weight vinyl acetate, 10-15 percent by weight methyl methacrylate, up to 10 percent by weight hydroxyethyl acrylate, with the balance being butyl acrylate.

Ethylenically unsaturated monomers used to prepare the shell of the polymeric microparticles may include acid functional monomers such as acrylic acid, methacrylic acid, maleic anhydride, fumaric acid and the like, as well as any of the additional ethylenically unsaturated monomers listed above, including the vinyl esters of alkyl carboxylic acids. A typical monomer mixture used to prepare the shell of the polymeric microparticles comprises 25-35 percent by weight methacrylic acid, 45-55 percent by weight hydroxyl functional monomer such as hydroxyethyl acrylate, 10-15 percent by weight methyl methacrylate, with the balance being butyl acrylate.

After formation of the core-shell polymers, the microparticles are dispersed in an aqueous medium. Neutralization of acid groups on the polymer may be done using, for example, inorganic bases such as ammonium hydroxide or amines such as dimethylethanolamine, diisopropanolamine, triethylamine, and the like. Effective dispersion techniques may include high shear mixing such as by homogenization, emulsification by use of an emulsifier such as a MICROFLUIDIZER® emulsifier which is available from Microfluidics Corporation in Newton, Mass., use of rotor/stator mixers, Cowles dispersers, or mixing a small volume of material with a conventional stirrer at a high agitation rate, such as illustrated in the examples.

The crosslinking agent (b) used in the waterborne curable film-forming composition has functional groups reactive with functional groups on the polymeric microparticles. Suitable crosslinking materials include aminoplasts, polyisocyanates, polyacids, anhydrides and mixtures thereof, as described below. The final resin solids content of the waterborne curable film-forming compositions is usually 25-30 percent by weight, often about 29 percent by weight, based on the total weight of resin solids in the curable film-forming composition.

Other coating compositions useful as either the first or second coating composition in the processes of the present invention comprise one or more film-forming resins. The compositions may be lacquers but are more often curable compositions. Curable compositions may further comprise a crosslinking agent.

Particularly useful polymeric film-forming resins are acrylic polymers, polyesters, including alkyds, and polyurethanes. Generally these polymers can be any polymers of these types made by any method known to those skilled in the art where the polymers are water dispersible or emulsifiable and preferably of limited water solubility.

Suitable acrylic polymers include copolymers of one or more alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, and preferably 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate, vinyl laurate, vinyl pivalate, and vinyl dodecanoate.

The acrylic copolymer can include hydroxyl functional groups, which are often incorporated into the polymer by including one or more hydroxyl functional monomers in the reactants used to produce the copolymer. Useful hydroxyl functional monomers include hydroxyalkyl acrylates and methacrylates, typically having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates, as well as the beta-hydroxy ester functional monomers described below. The acrylic polymer can also be prepared with N-(alkoxymethyl) acrylamides and N-(alkoxymethyl)methacrylamides.

Beta-hydroxy ester functional monomers can be prepared from ethylenically unsaturated, epoxy functional monomers and carboxylic acids having from about 13 to about 20 carbon atoms, or from ethylenically unsaturated acid functional monomers and epoxy compounds containing at least 5 carbon atoms which are not polymerizable with the ethylenically unsaturated acid functional monomer.

Useful ethylenically unsaturated, epoxy functional monomers used to prepare the beta-hydroxy ester functional monomers include, but are not limited to, glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. Glycidyl acrylate and glycidyl methacrylate are preferred. Examples of carboxylic acids include, but are not limited to, saturated monocarboxylic acids such as isostearic acid and aromatic unsaturated carboxylic acids.

Useful ethylenically unsaturated acid functional monomers used to prepare the beta-hydroxy ester functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, preferably containing from 8 to 30 carbon atoms, such as butyl glycidyl ether, octyl glycidyl ether, phenyl glycidyl ether and para-(tertiary butyl) phenyl glycidyl ether. Preferred glycidyl esters include those of the structure:

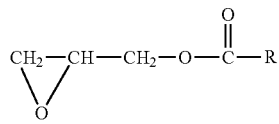

where R is a hydrocarbon radical containing from about 4 to about 26 carbon atoms. Preferably, R is a branched hydrocarbon group having from about 8 to about 10 carbon atoms, such as neopentanoate, neoheptanoate or neodecanoate. Suitable glycidyl esters of carboxylic acids include VERSATIC ACID 911 and CARDURA E, each of which is commercially available from Shell Chemical Co.

Carbamate functional groups can be included in the acrylic polymer by copolymerizing the acrylic monomers with a carbamate functional vinyl monomer, such as a carbamate functional alkyl ester of methacrylic acid. Alternatively, carbamate functionality may be introduced into the acrylic polymer by reacting a hydroxyl functional acrylic polymer with a low molecular weight carbamate functional material, such as can be derived from an alcohol or glycol ether, via a transcarbamoylation reaction. In this reaction, a low molecular weight carbamate functional material derived from an alcohol or glycol ether is reacted with the hydroxyl groups of the acrylic polyol, yielding a carbamate functional acrylic polymer and the original alcohol or glycol ether. The low molecular weight carbamate functional material derived from an alcohol or glycol ether may be prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether and methanol are most often used.

Amide functionality may be introduced to the acrylic polymer by using suitably functional monomers in the preparation of the polymer, or by converting other functional groups to amido-groups using techniques known to those skilled in the art. Likewise, other functional groups may be incorporated as desired using suitably functional monomers if available or conversion reactions as necessary.

The acrylic polymer may also comprise an aqueous dispersion of internally crosslinked polymeric microparticles having a core-shell morphology such as those described above, wherein the vinyl monomer in the core is replaced with an alternative monomer such as methyl methacrylate or butyl acrylate.

Acrylic polymers can be prepared via aqueous emulsion polymerization techniques and used directly in the preparation of the aqueous coating compositions, or can be prepared via organic solution polymerization techniques with groups capable of salt formation such as acid or amine groups. Upon neutralization of these groups with a base or acid the polymers can be dispersed into aqueous medium. The acrylic polymers may alternatively be solventborne. Generally any method of producing such polymers that is known to those skilled in the art utilizing art recognized amounts of monomers can be used.

It is also possible to use a radiation curable coating composition, comprising ethylenically unsaturated monomers including any of those disclosed above and combinations thereof.

Besides acrylic polymers, the polymeric film-forming resin in the coating composition may be an alkyd resin or a polyester. Such polymers may be prepared in a known manner by condensation of polyhydric alcohols and polycarboxylic acids. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used.

Useful alkyd resins include polyesters of polyhydroxyl alcohols and polycarboxylic acids chemically combined with various drying, semi-drying and non-drying oils in different proportions. Thus, for example, the alkyd resins are made from polycarboxylic acids such as phthalic acid, maleic acid, fumaric acid, isophthalic acid, succinic acid, adipic acid, azeleic acid, sebacic acid as well as from anhydrides of such acids, where they exist. The polyhydric alcohols which can be reacted with the polycarboxylic acid include 1,4-butanediol, 1,6-hexanediol, neopentyl glycol, ethylene glycol, diethylene glycol and 2,3-butylene glycol, glycerol, trimethylolpropane, pentaerythritol, sorbitol and mannitol.

The alkyd resins are produced by reacting the polycarboxylic acid and the polyhydric alcohol together with a drying, semi-drying or non-drying oil in proportions depending upon the properties desired. The oils are coupled into the resin molecule by esterification during manufacturing and become an integral part of the polymer. The oil is fully saturated or predominately unsaturated. When cast into films, fully saturated oils tend to give a plasticizing effect to the film, whereas predominately unsaturated oils tend to crosslink and dry rapidly with oxidation to give more tough and solvent resistant films. Suitable oils include coconut oil, fish oil, linseed oil, tung oil, castor oil, cottonseed oil, safflower oil, soybean oil, and tall oil. Various proportions of the polycarboxylic acid, polyhydric alcohol and oil are used to obtain alkyd resins of various properties as is well known in the art.

Carbamate functional groups may be incorporated into the polyester by first forming a hydroxyalkyl carbamate which can be reacted with the polyacids and polyols used in forming the polyester. The hydroxyalkyl carbamate is condensed with acid functionality on the polyester, yielding terminal carbamate functionality. Carbamate functional groups may also be incorporated into the polyester by reacting terminal hydroxyl groups on the polyester with a low molecular weight carbamate functional material via a transcarbamoylation process similar to the one described above in connection with the incorporation of carbamate groups into the acrylic polymers, or by reacting isocyanic acid with a hydroxyl functional polyester.

Other functional groups such as amide, thiol, urea, and thiocarbamate may be incorporated into the polyester or alkyd resin as desired using suitably functional reactants if available, or conversion reactions as necessary to yield the desired functional groups. Such techniques are known to those skilled in the art.

Polyurethanes can also be used in the coating composition. Among the polyurethanes which can be used are polymeric polyols which generally are prepared by reacting the polyester polyols or acrylic polyols such as those mentioned above with a polyisocyanate such that the OH/NCO equivalent ratio is greater than 1:1 so that free hydroxyl groups are present in the product. The organic polyisocyanate which is used to prepare the polyurethane polyol can be an aliphatic or an aromatic polyisocyanate or a mixture of the two. Diisocyanates are preferred, although higher polyisocyanates can be used in place of or in combination with diisocyanates. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate. As with the polyesters, the polyurethanes can be prepared with unreacted carboxylic acid groups, which upon neutralization with bases such as amines allows for dispersion into aqueous medium.

Terminal and/or pendent carbamate functional groups can be incorporated into the polyurethane by reacting a polyisocyanate with a polymeric polyol containing the terminal/pendent carbamate groups. Alternatively, carbamate functional groups can be incorporated into the polyurethane by reacting a polyisocyanate with a polyol and a hydroxyalkyl carbamate or isocyanic acid as separate reactants. Carbamate functional groups can also be incorporated into the polyurethane by reacting a hydroxyl functional polyurethane with a low molecular weight carbamate functional material via a transcarbamoylation process similar to the one described above in connection with the incorporation of carbamate groups into the acrylic polymer. Additionally, an isocyanate functional polyurethane can be reacted with a hydroxyalkyl carbamate to yield a carbamate functional polyurethane.

Other functional groups such as amide, thiol, urea, and thiocarbamate may be incorporated into the polyurethane as desired using suitably functional reactants if available, or conversion reactions as necessary to yield the desired functional groups. Such techniques are known to those skilled in the art.

As noted above, when the coating composition used in the process of the present invention is curable, it may further comprise a crosslinking agent. Suitable crosslinking materials include aminoplasts, polyisocyanates, polyacids, anhydrides and mixtures thereof. Useful aminoplast resins are based on the addition products of formaldehyde with an amino- or amido-group carrying substance. Condensation products obtained from the reaction of alcohols and formaldehyde with melamine, urea or benzoguanamine are most common and preferred herein. While the aldehyde employed is most often formaldehyde, other similar condensation products can be made from other aldehydes, such as acetaldehyde, crotonaldehyde, acrolein, benzaldehyde, furfural, glyoxal and the like.

Condensation products of other amines and amides can also be used, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Non-limiting examples of such compounds include N,N'-dimethyl urea, benzourea, dicyandiamide, formaguanamine, acetoguanamine, glycoluril, ammeline, 3,5-diaminotriazole, triaminopyrimidine, and 2-mercapto-4,6-diaminopyrimidine.

The aminoplast resins often contain methylol or similar alkylol groups, and in most instances at least a portion of these alkylol groups are etherified by reaction with an alcohol. Any monohydric alcohol can be employed for this purpose, including methanol, ethanol, propanol, butanol, pentanol, hexanol, heptanol, as well as benzyl alcohol and other aromatic alcohols, cyclic alcohols such as cyclohexanol, monoethers of glycols, and halogen-substituted or other substituted alcohols such as 3-chloropropanol and butoxyethanol. Many aminoplast resins are partially alkylated with methanol or butanol.

Polyisocyanates that may be utilized as crosslinking agents can be prepared from a variety of isocyanate-containing materials. The polyisocyanate may be a blocked polyisocyanate. Examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used. Examples of suitable blocking agents include those materials which would unblock at elevated temperatures such as lower aliphatic alcohols including methanol, oximes such as methyl ethyl ketoxime, lactams such as caprolactam and pyrazoles such as dimethyl pyrazole.

Examples of polycarboxylic acids that are suitable for use as a crosslinking agent include those described in U.S. Pat. No. 4,681,811, at column 6, line 45 to column 9, line 54. Suitable polyanhydrides include those disclosed in U.S. Pat. No. 4,798,746, at column 10, lines 16-50, and in U.S. Pat. No. 4,732,790, at column 3, lines 41 to 57. The cited portions of each of these patents are incorporated herein by reference.

The coating compositions used in the process of the present invention may contain adjunct ingredients conventionally used in coating compositions. Optional ingredients such as, for example, plasticizers, surfactants, thixotropic agents, anti-gassing agents, organic cosolvents, flow controllers, anti-oxidants, UV light absorbers and similar additives conventional in the art may be included in the composition. These ingredients are typically present at up to about 40% by weight based on the total weight of resin solids.

All of the coating compositions described above may contain colorants conventionally used in surface coatings, rendering them translucent or opaque. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions, rendering the coating composition translucent or opaque. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference in its entirety. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference in its entirety, and U.S. Provisional Application No. 60/482,167 filed Jun. 24, 2003.

Example special effect compositions that may be used in the coating composition include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as reflectivity, opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference in its entirety. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In certain embodiments, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004.

In general, the colorant can be present in the coating composition in any amount sufficient to impart the desired property, visual and/or color effect. The colorant may comprise from 1 to 65 weight percent of the present compositions, such as from 3 to 40 weight percent or 5 to 35 weight percent, with weight percent based on the total weight of the compositions.

In automotive applications, when the color to be applied to the vehicle substrate is a solid color, the first coating composition used in step (A) and the second coating composition used in step (B) are often the same. When the color to be applied to the vehicle substrate provides a visual effect, such as a metallic color or color-changing tint or pigment, the second coating composition used in step (B) contains the effect colorant and comprises the waterborne curable film-forming composition described above, comprising:

(a) an aqueous dispersion of internally crosslinked polymeric microparticles having a core-shell morphology and having reactive functional groups; and (b) a crosslinking agent having functional groups reactive with functional groups on the polymeric microparticles;

wherein the core of the polymeric microparticles is prepared from a monomer mixture comprising at least 20 percent by weight of a monomer having the structure:

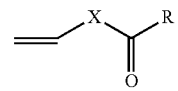

wherein X is N or O; R is a linear or branched alkyl group having 1 to 18 carbon atoms, or R is bonded to X to form a 5- to 7-member ring. In this embodiment, the first coating composition used in step (A) may be the same as or different from that used in step (B), with the same or different colorants, but is usually different for cost effectiveness.

In step (A) of the process of the present invention, a first coating composition is applied to at least a portion of a surface of the substrate. The first coating composition, and all subsequent coating layers, may be applied to the substrate by one or more of a number of methods including spraying, rolling, curtain coating, dipping/immersion, brushing, or flow coating, but they are most often applied by spraying for the sake of appearance. The usual spray techniques and equipment for air spraying and electrostatic spraying and either manual or automatic methods can be used. The first coating composition is applied in an amount to yield a dry film thickness of 15 to 30 microns.

After forming a film of the first coating layer on the substrate, the first coating layer can be given a drying step in which solvent is driven out of the coating film by heating or an air drying period at room temperature before application of the second coating composition. Suitable drying conditions may depend, for example, on the ambient temperature and humidity. Alternatively, the second coating composition may be applied immediately to the first without drying the first coating. In any event, the second coating composition is applied to at least a portion of the uncured first coating formed in step (A) prior to substantially curing the first coating, forming a substantially uncured secondary coating thereon. Such a coating process is often referred to as "wet-on-wet". The second coating layer typically has a dry film thickness of 10 to 25 microns.

After application of the second coating composition to the first, forming a composite coating on the substrate, the process of the present invention may comprise an additional step (C) wherein the coated substrate may be held at a temperature and for a time sufficient to substantially cure the composite coating after all coating layers have been applied to the substrate. Such cure protocols typically include a temperature range of 70 to 180° C. for a time of 10 to 120 minutes.

Alternatively, in certain embodiments of the present invention, the process may include a subsequent step (C) of applying a clear coating composition to at least a portion of the uncured secondary coating formed in step (B) prior to substantially curing the secondary coating, to form a substantially uncured clear coating thereon. The clear coating composition may be applied to the secondary coating layer using any of the methods described above. It may be applied to the wet secondary coating, or the secondary coating may be held for an ambient or elevated temperature flash prior to application of the clear coating composition in step (C). The flash may be at the same temperature and duration as that between steps (A) and (B), or either or both aspects of the flash may be different.

The clear coating composition may be any of those known in the art of surface coatings; it is typically a curable film-forming composition comprising a polymeric binder with functional groups and a curing agent having functional groups reactive with those on the polymeric binder. It may be the same as or different from either of the previously applied coating compositions. Like the other film-forming compositions, the clear coating composition can include a variety of optional ingredients and/or additives such as curing catalysts, reinforcements, thixotropes, accelerators, surfactants, plasticizers, extenders, stabilizers, corrosion inhibitors, diluents, hindered amine light stabilizers, UV light absorbers, and antioxidants.

After application of the clear coating composition to the secondary coating composition, the coated substrate may be held in a step (D) at a temperature and for a time sufficient to substantially cure the composite coating after all coating layers have been applied to the substrate. Such cure protocols may be the same as or different from that used previously.

The clear coating layer applied in step (C) typically has a dry film thickness of 30 to 50 microns.

Coated substrates prepared in accordance with the method of the present invention demonstrate improved smoothness as measured by long wave (LW) and short wave (SW) techniques, and further demonstrate improved chip resistance, compared to composite coatings formed by processes using compositions with polymeric microparticles that do not contain high levels of vinyl esters of alkyl carboxylic acids in the core of the polymeric microparticle conventional processes or other compact processes.

The following examples are intended to illustrate various embodiments of the invention, and should not be construed as limiting the invention in any way.

EXAMPLES

Example A (Used in Control)

An acrylic latex was prepared as follows:
A mixture of 1268 g of deionized water and 4.4 g of Rhodapex AB/20 (surfactant from Solvay-Rhodia) was charged into a four necked round bottom flask and heated to 65° C. with $N_2$ blanket. A mixture of 6.4 g of butyl acrylate, 19 g of methyl methacrylate and 0.6 g of methacrylic acid was then added into the flask, and the temperature was raised to 85° C. It was followed by the addition of 0.21 g of ammonium persulfate dissolved in 33 g of deionized water. The reaction mixture was held for 30 minutes. After that, a pre-emulsion with 753 g of deionized water, 9.7 g of Rhodapex AB/20, 473 g of methyl methacrylate, 190 g of butyl acrylate, 41.4 g of 50% acrylamide aqueous solution, 17.5 g of ethylene glycol dimethacrylate and 17.4 g of hydroxyethyl methacrylate was added into the flask over 3 hours, simultaneously with a mixture of 0.58 g of ammonium persulfate and 151 g of deionized water. After the completion of feeds, the reaction was held for 1 hour. A pre-emulsion with 95 g of deionized water, 1.4 g of Rhodapex AB/20, 39.5 g of butyl acrylate, 24.7 g of methacrylic acid, 18.1 g of methyl methacrylate, and 26.2 g of hydroxyethyl acrylate was added into the flask over 1.5 hours simultaneously with a mixture of 0.3 g ammonium persulfate, 0.95 g of granular borax and 116 g of deionized water. After the completion of the feeds, the product was held for 2 hours, followed by cooling to 70° C., and then adding mixture of 6.3 g of dimethyl ethanolamine dissolved in 39 g of deionized water over 20 minutes. Finally, 8.9 g of acticide (MBS) dissolved in 31 g of deionized water was added into the finished latex.

Example B

An acrylic latex was prepared as follows:
A mixture of 1268.5 g of deionized water and 4.4 g of Rhodapex AB/20 (surfactant from Solvay-Rhodia) was charged into a four necked round bottom flask and heated to 65° C. with $N_2$ blanket. A mixture of 6.4 g of butyl acrylate, 19 g of methyl methacrylate and 0.6 g of methacrylic acid was then added into the flask and rinsed with 23.9 g of deionized water, and the temperature was raised to 85° C. It was followed by the addition of 0.21 g of ammonium persulfate dissolved in 4.8 g of deionized water and rinsed with 4.8 g of deionized water. The reaction mixture was held for 30 minutes and then cooled to 70° C. After that, a pre-emulsion with 753 g of deionized water, 9.7 g of Rhodapex AB/20, 472.5 g of methyl methacrylate, 95 g of vinyl acetate, 95 g of butyl acrylate, 41.4 g of 50% acrylamide aqueous solution, 17.5 g of ethylene glycol dimethacrylate and 17.4 g of hydroxyethyl methacrylate was added into the flask over 5 hours, simultaneously with a mixture of 0.72 g of ammonium persulfate and 150.5 g of deionized water. After the completion of feeds, the reaction was held for 1 hour. Halfway through the hold, the temperature was increased to 85° C. A pre-emulsion with 60.9 g of deionized water, 1.4 g of Rhodapex AB/20, 39.5 g of butyl acrylate, 24.7 g of methacrylic acid, 18.1 g of methyl methacrylate, and 26.2 g of hydroxyethyl acrylate was added into the flask over 1.5 hours simultaneously with half of a mixture of 0.3 g ammonium persulfate, 0.95 g of granular borax and 115.6 g of deionized water. The monomer feed was washed with 15.9 g of deionized water and the remaining half of the initiator feed was added over 45 minutes, and then rinsed with 15.9 g of deionized water. The product was held for 2 hours, followed by cooling to 70° C., and then adding a mixture of 6.3 g of dimethyl ethanolamine dissolved in 38.5 g of deionized water over 20 minutes. Finally, 8.9 g of acticide (MBS) dissolved in 64.9 g of deionized water was added into the finished latex and rinsed with 15.9 g of deionized water.

Example C

An acrylic latex was prepared as follows:

A mixture of 1268.5 g of deionized water and 4.4 g of Rhodapex AB/20 (surfactant from Solvay-Rhodia) was charged into a four necked round bottom flask and heated to 65° C. with $N_2$ blanket. A mixture of 6.4 g of butyl acrylate, 19 g of methyl methacrylate and 0.6 g of methacrylic acid was then added into the flask and rinsed with 23.9 g of deionized water, and the temperature was raised to 85° C. It was followed by the addition of 0.21 g of ammonium persulfate dissolved in 4.8 g of deionized water and rinsed with 4.8 g of deionized water. The reaction mixture was held for 30 minutes and then cooled to 70° C. After that, a pre-emulsion with 753 g of deionized water, 9.7 g of Rhodapex AB/20, 472.5 g of methyl methacrylate, 190 g of vinyl acetate, 41.4 g of 50% acrylamide aqueous solution, 17.5 g of ethylene glycol dimethacrylate and 17.4 g of hydroxyethyl methacrylate was added into the flask over 5 hours, simultaneously with a mixture of 0.72 g of ammonium persulfate and 150.5 g of deionized water. After the completion of feeds, the reaction was held for 1 hour. Halfway through the hold, the temperature was increased to 85° C. A pre-emulsion with 60.9 g of deionized water, 1.4 g of Rhodapex AB/20, 39.5 g of butyl acrylate, 24.7 g of methacrylic acid, 18.1 g of methyl methacrylate, and 26.2 g of hydroxyethyl acrylate was added into the flask over 1.5 hours simultaneously with half of a mixture of 0.3 g ammonium persulfate, 0.95 g of granular borax and 115.6 g of deionized water. The monomer feed was washed with 15.9 g of deionized water and the remaining half of the initiator feed was added over 45 minutes, and then rinsed with 15.9 g of deionized water. The product was held for 2 hours, followed by cooling to 70° C., and then adding a mixture of 6.3 g of dimethyl ethanolamine dissolved in 38.5 g of deionized water over 20 minutes. Finally, 8.9 g of acticide (MBS) dissolved in 64.9 g of deionized water was added into the finished latex and rinsed with 15.9 g of deionized water.

Example D

An acrylic latex was prepared as follows:

A mixture of 1268.5 g of deionized water and 4.4 g of Rhodapex AB/20 (surfactant from Solvay-Rhodia) was charged into a four necked round bottom flask and heated to 65° C. with $N_2$ blanket. A mixture of 6.4 g of butyl acrylate, 19 g of methyl methacrylate and 0.6 g of methacrylic acid was then added into the flask and rinsed with 23.9 g of deionized water, and the temperature was raised to 85° C. It was followed by the addition of 0.21 g of ammonium persulfate dissolved in 4.8 g of deionized water and rinsed with 4.8 g of deionized water. The reaction mixture was held for 30 minutes and then cooled to 70° C. After that, a pre-emulsion with 753 g of deionized water, 9.7 g of Rhodapex AB/20, 236.2 g of methyl methacrylate, 331.3 g of vinyl acetate, 95 g of butyl acrylate, 41.4 g of 50% acrylamide aqueous solution, 17.5 g of ethylene glycol dimethacrylate and 17.4 g of hydroxyethyl methacrylate was added into the flask over 5 hours, simultaneously with a mixture of 0.72 g of ammonium persulfate and 150.5 g of deionized water. After the completion of feeds, the reaction was held for 1 hour. Halfway through the hold, the temperature was increased to 85° C. A pre-emulsion with 60.9 g of deionized water, 1.4 g of Rhodapex AB/20, 39.5 g of butyl acrylate, 24.7 g of methacrylic acid, 18.1 g of methyl methacrylate, and 26.2 g of hydroxyethyl acrylate was added into the flask over 1.5 hours simultaneously with half of a mixture of 0.3 g ammonium persulfate, 0.95 g of granular borax and 115.6 g of deionized water. The monomer feed was washed with 15.9 g of deionized water and the remaining half of the initiator feed was added over 45 minutes, and then rinsed with 15.9 g of deionized water. The product was held for 2 hours, followed by cooling to 70° C., and then adding a mixture of 6.3 g of dimethyl ethanolamine dissolved in 38.5 g of deionized water over 20 minutes. Finally, 8.9 g of acticide (MBS) dissolved in 64.9 g of deionized water was added into the finished latex and rinsed with 15.9 g of deionized water.

Example E

An acrylic latex was prepared as follows:

A mixture of 1268.5 g of deionized water and 4.4 g of Rhodapex AB/20 (surfactant from Solvay-Rhodia) was charged into a four necked round bottom flask and heated to 65° C. with $N_2$ blanket. A mixture of 6.4 g of butyl acrylate, 19 g of methyl methacrylate and 0.6 g of methacrylic acid was then added into the flask and rinsed with 23.9 g of deionized water, and the temperature was raised to 85° C. It was followed by the addition of 0.21 g of ammonium persulfate dissolved in 4.8 g of deionized water and rinsed with 4.8 g of deionized water. The reaction mixture was held for 30 minutes and then cooled to 70° C. After that, a pre-emulsion with 753 g of deionized water, 9.7 g of Rhodapex AB/20, 236.2 g of methyl methacrylate, 331.3 g of vinyl acetate, 95 g of butyl acrylate, 17.5 g of ethylene glycol dimethacrylate and 38.1 g of hydroxyethyl methacrylate was added into the flask over 5 hours, simultaneously with a mixture of 0.72 g of ammonium persulfate and 150.5 g of deionized water. After the completion of feeds, the reaction was held for 1 hour. Halfway through the hold, the temperature was increased to 85° C. A pre-emulsion with 60.9 g of deionized water, 1.4 g of Rhodapex AB/20, 39.5 g of butyl acrylate, 24.7 g of methacrylic acid, 18.1 g of methyl methacrylate, and 26.2 g of hydroxyethyl acrylate was added into the flask over 1.5 hours simultaneously with half of a mixture of 0.3 g ammonium persulfate, 0.95 g of granular borax and 115.6 g of deionized water. The monomer feed was washed with 15.9 g of deionized water and the remaining half of the initiator feed was added over 45 minutes, and then rinsed with 15.9 g of deionized water. The product was held for 2 hours, followed by cooling to 70° C., and then adding a mixture of 6.3 g of dimethyl ethanolamine dissolved in 38.5 g of deionized water over 20 minutes. Finally, 8.9 g of acticide (MBS) dissolved in 64.9 g of deionized water was added into the finished latex and rinsed with 15.9 g of deionized water.

Example F

An acrylic latex was prepared the same as Example E above, except that the first pre-emulsion and its corresponding initiator mixture were added over 3 hours instead of 5 hours.

Example G

This example was prepared in two parts:

Part 1: Polyurethane

A mixture containing a polyurethane acrylate prepolymer was prepared by adding 100 g of 2-ethylhexyl acrylate (EHA), 79.2 g of hydroxyethyl methacrylate, 81.6 g of dimethylol propionic acid, 1.5 g of 2,6-di-tert-butyl 4-methyl phenol, 0.8 g of triphenyl phosphite, 4 g triethyl amine and 0.8 g of dibutyl tin dilaurate to a four necked round bottom flask fitted with a thermocouple, mechanical stirrer, and condenser and heated to 90° C. to obtain a homogeneous solution. Then 405.5 g of polytetrahydrofuran molecular weight 1000 was added. To this mixture at 90° C., isophorone diisocyanate 225.4 g was added over 90 minutes. The isocyanate container was rinsed with 20.0 g of EHA. The reaction mixture was stirred at 90° C. until all the isocyanate groups were reacted. Then 454.0 g of EHA and 72.5 g of propylene glycol monomethyl ether was added and cooled to ambient temperature.

Part 2: Polyurethane Acrylic Latex

For the purpose of control, a polyurethane acrylic latex with no keto ethylenically unsaturated monomer, and 5.5% multi-ethylenically unsaturated monomer was prepared as follows:

Ten (20.0) g of Aerosol OT-75 (surfactant from Cytec Industries), 14.0 g of dimethyl ethanolamine, 369 g of prepared polyurethane/EHA mixture of Example A', 14.5 g of 1,6-hexanediol diacrylate, 97.0 g methyl methacrylate and 711 g of deionized water were charged to a four necked round bottom flask fitted with a thermocouple, mechanical stirrer, and condenser and heated to 33° C. to obtain a homogeneous solution. 0.45 g of t-butylhydroperoxide and 18.6 g of deionized water was then charged into the flask and mixed for 10 minutes. After that, 0.009 g of ferrous ammonium sulfate, 0.45 g of sodium metabisulfite and 18.6 g of deionized water were charged over 30 minutes. During this charge, exotherm was expected. After peak exotherm, the system was held at 65° C. for 1 hour. After it cooled to 45° C., 4.3 g of acticide MBS (biocide from Thor GmbH), 0.23 g of FOAMKILL 649 (defoamer from Crucible Chemical Co.) and 9.6 g of deionized water were charged into the flask and mixed for 15 minutes.

Example H

A polyester was prepared according to Example 9 of U.S. Pat. No. 6,762,240. The polyester was dispersed in water to a solids of 20 percent before mixing with other paint components. Dimethyl ethanolamine was used as a neutralizing amine for the acidic groups during the dispersion.

Six (6) Silver basecoat compositions were prepared from the following mixture of ingredients:

| Components | Parts by weight of Component | | | | | |
|---|---|---|---|---|---|---|
| | Example 1 (control) | Example 2 | Example 3 | Example 4 | Example 5 | Example 6 |
| Acrylic latex[1] | 46.0 | — | — | — | — | — |
| Acrylic latex[2] | — | 46.4 | — | — | — | — |
| Acrylic latex[3] | — | — | 46.6 | — | — | — |
| Acrylic latex[4] | — | — | — | 48.0 | — | — |
| Acrylic latex[5] | — | — | — | — | 48.2 | — |
| Acrylic latex[6] | — | — | — | — | — | 47.1 |
| Polyurethane Acrylic latex[7] | 77.8 | 77.8 | 77.8 | 77.8 | 77.8 | 77.8 |
| Polyester resin[8] | 105.0 | 105.0 | 105.0 | 105.0 | 105.0 | 105.0 |
| Byk 348 surfactant[9] | 0.24 | 0.24 | 0.24 | 0.24 | 0.24 | 0.24 |
| Laponite[10] | 1.8 | 1.8 | 1.8 | 1.8 | 1.8 | 1.8 |
| Resimene HM2608[11] | 34.4 | 34.4 | 34.4 | 34.4 | 34.4 | 34.4 |
| Polyester[12] | 7.0 | 7.0 | 7.0 | 7.0 | 7.0 | 7.0 |
| Deionized Water | 122.9 | 112.0 | 112.0 | 112.0 | 112.0 | 112.0 |
| 50% DMEA[13] | 1.6 | 1.6 | 1.6 | 1.6 | 1.6 | 1.6 |
| White Tint[14] | 1.3 | 1.3 | 1.3 | 1.3 | 1.3 | 1.3 |
| White Tint[15] | 0.5 | 0.5 | 0.5 | 0.5 | 0.5 | 0.5 |
| Black Tint[16] | 0.4 | 0.4 | 0.4 | 0.4 | 0.4 | 0.4 |
| Blue Tint[17] | 0.2 | 0.2 | 0.2 | 0.2 | 0.2 | 0.2 |
| Aluminum paste[18] | 31.4 | 31.4 | 31.4 | 31.4 | 31.4 | 31.4 |
| Passivator solution[19] | 10.1 | 10.1 | 10.1 | 10.1 | 10.1 | 10.1 |
| 2-Ethyl hexanol solvent[20] | 18.8 | 18.8 | 18.8 | 18.8 | 18.8 | 18.8 |
| Odorless Mineral spirits[21] | 7.5 | 7.5 | 7.5 | 7.5 | 7.5 | 7.5 |
| Dowanol PnB[22] | 26.0 | 26.0 | 26.0 | 26.0 | 26.0 | 26.0 |
| TOTAL | 492.9 | 482.6 | 482.6 | 482.6 | 482.6 | |

[1]Example A.
[2]Example B.
[3]Example C.
[4]Example D.
[5]Example E.
[6]Example F.
[7]Example G
[8]Example H
[9]Additives available from Byk Chemie.
[10]Laponite RD is a synthetic layered silicate available from Southern Clay Products
[11]Melamine curing agent commercially available from INEOS Melamines.
[12]A polyester resin was prepared according to Example 1 of U.S. Pat. No. 6,291,564.
[13]Dimethyl ethanolamine 50% aqueous solution.
[14]Micronized White tint paste consisting of 24% $TiO_2$ dispersed in 17% acrylic polymer blend and having a solids content of 42%.
[15]White tint paste consisting of 61% $TiO_2$ dispersed in 9% acrylic polymer blend and having a solids content of 70%.
[16]Black tint paste consisting of 6% carbon black Monarch 1300 dispersed in 17% acrylic polymer blend and having a solids content of 24%.
[17]Blue tint paste consisting of 14% Palomar Blue available from Sun Chemical and dispersed in 22% acrylic polymer blend and having a solids content of 36%.
[18]TSB 2180A aluminum paste available from Toyal America
[19]Aluminum passivator
[20]Solvent available from Dow Chemical Co.
[21]Solvent available from Shell Chemical Co
[22]Propylene glycol n-butyl ether available from Dow Chemical Co.

| Example | BYK WAVESCAN[1] | | Initial DOI[2] | GRAVELOMETER[3] Chips >3 mm |
|---|---|---|---|---|
| | Long Wave | Short Wave | | |
| 1 (Control) | 10 | 26 | 75 | 2 |
| 2 | 7 | 17 | 83 | 2 |
| 3 | 7 | 16 | 85 | 0 |
| 4 | 8 | 21 | 80 | 0 |
| 5 | 5 | 16 | 85 | 0 |

[1] BYK WAVESCAN instrument manufactured by BYK Gardner USA of Columbia, Maryland.
[2] Distinctness of Image (DOI) meter manufactured by TRICOR Systems, Inc. of Elgin, Illinois.
[3] PPG STM-0744, or GM Test Method #GME 60-268, −20° C. with a rating scale indicating the number of chips with a diameter greater than 3 mm.

Each basecoat was spray applied in an environment controlled to 70-75° F. (21-24° C.) and 50-60% relative humidity onto 4 inch by 12 inch (10 cm by 30 cm) steel panels that were coated with PPG Electrocoat (ED 6060C) coated with APR54476 primer commercially available from PPG Industries, Inc. The substrate panels were obtained from ACT Test Panels, LLC of Hillsdale, Mich. The basecoats were applied in two coats, without a flash between coats, and then flashed at ambient temperature for 5 minutes and then dehydrated for 5 minutes at 185° F. (85° C.). The film thickness was approximately 0.55 mils (14 microns). A 2K clearcoat commercially available from PPG Industries, Inc. as TKAPO1000 was then applied over the basecoated panels in two coats without a flash between coats. The clearcoated panels were allowed to flash for 10 minutes at ambient conditions and baked for 30 minutes at 285° F. (140° C.). The film thickness was approximately 2.0 mils (50 microns).

Appearance and physical properties were measured on the coated panels. Lower BYK Wavescan values and higher DOI values are more desirable for appearance. Lower numbers of chips for the GRAVELOMETER chip test is desirable.

Therefore, we claim:

1. A method for forming a composite coating on a substrate comprising:
   (A) applying a first coating composition to at least a portion of a surface of the substrate; and
   (B) applying a second coating composition to at least a portion of the first coating formed in step (A) prior to substantially heating or curing the first coating, to form a secondary coating thereon and yielding a composite coating; wherein the first and/or second coating composition is a waterborne curable film-forming composition comprising an aqueous dispersion of:
      (a) internally crosslinked polymeric microparticles having a core-shell morphology and having reactive functional groups; and
      (b) a crosslinking agent having functional groups reactive with functional groups on the polymeric microparticles;
   wherein the core of the polymeric microparticles is prepared from a monomer mixture comprising at least 20 percent by weight of a monomer having the structure:

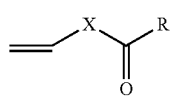

wherein X is N or O; R is a linear or branched alkyl group having 1 to 18 carbon atoms, or R is bonded to X to form a 5- to 7-member ring; based on the total weight of monomers in the monomer mixture.

2. The method of claim 1, wherein the first coating layer is applied over the substrate to yield a dry film thickness of 15 to 30 microns.

3. The method according to claim 1, further comprising an initial step of forming an electrodeposited coating upon the surface of the substrate prior to applying the first coating composition of step (A), wherein the first coating composition is applied directly onto the electrodeposited coating.

4. The method according to claim 1, further comprising: (C) holding the substrate at a temperature and for a time sufficient to substantially cure the composite coating after all coating layers have been applied to the substrate.

5. The method of claim 1, further comprising: (C) applying a clear coating composition to at least a portion of the secondary coating applied in step (B) prior to substantially curing the secondary coating, to form a clear coating thereon.

6. The method according to claim 5, further comprising: (D) holding the substrate at a temperature and for a time sufficient to substantially cure the composite coating after all coating layers have been applied to the substrate.

7. The method of claim 1, wherein the first and second coating compositions are the same and each further comprises a colorant.

8. The method of claim 1, wherein the second coating composition is the waterborne curable film-forming composition comprising:
   (a) an aqueous dispersion of internally crosslinked polymeric microparticles having a core-shell morphology and having reactive functional groups; and
   (b) a crosslinking agent having functional groups reactive with functional groups on the polymeric microparticles;
wherein the core of the polymeric microparticles is prepared from a monomer mixture comprising at least 20 percent by weight of a monomer having the following structure:

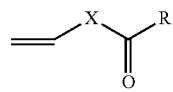

wherein X is N or O; R is a linear or branched alkyl group having 1 to 18 carbon atoms, or R is bonded to X to form a 5- to 7-member ring; and wherein the second coating composition further comprises a metallic effect colorant.

9. The method of claim 1, wherein the monomer mixture used to prepare the core of the polymeric microparticles further comprises methyl methacrylate, butyl acrylate, and at least one monomer having two or more ethylenically unsaturated groups.

10. The method of claim 9, wherein the monomer mixture used to prepare the core of the polymeric microparticles further comprises at least one hydroxy functional ethylenically unsaturated monomer.

11. The method of claim 9, wherein the monomer mixture used to prepare the core of the polymeric microparticles is essentially free of styrene.

12. The method of claim 1, wherein the monomer mixture used to prepare the shell of the polymeric microparticles comprises methyl methacrylate, butyl acrylate, at least one hydroxy functional ethylenically unsaturated monomer, and at least one acid functional ethylenically unsaturated monomer.

13. The method of claim 12, wherein the monomer mixture used to prepare the shell of the polymeric microparticles comprises 25 to 35 percent by weight acid functional ethylenically unsaturated monomer.

14. The method of claim 12, wherein the monomer mixture used to prepare the shell of the polymeric microparticles comprises 45 to 55 percent by weight hydroxy functional ethylenically unsaturated monomer.

15. The method of claim 1, wherein the crosslinking agent comprises an aminoplast.

16. The method of claim 1, wherein the waterborne curable film-forming composition has a resin solids content of 25 to 30 percent by weight, based on the total weight of resin solids in the curable film-forming composition.

\* \* \* \* \*